UNITED STATES PATENT OFFICE.

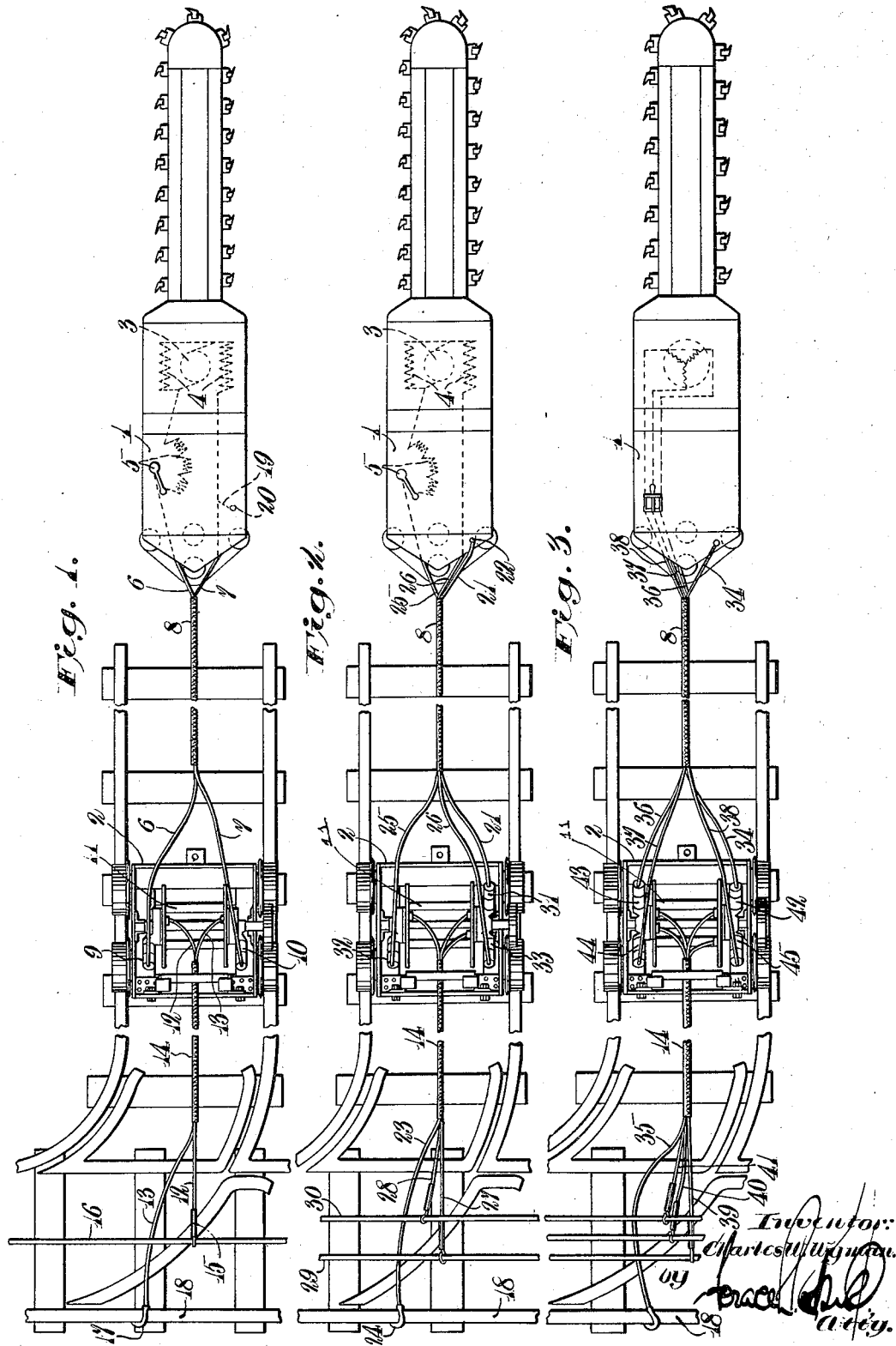

CHARLES W. WYMAN, OF CLAREMONT, NEW HAMPSHIRE, ASSIGNOR TO SULLIVAN MACHINERY COMPANY, A CORPORATION OF MASSACHUSETTS.

MINING APPARATUS.

1,407,120.  Specification of Letters Patent.  Patented Feb. 21, 1922.

Application filed June 18, 1921. Serial No. 478,511.

*To all whom it may concern:*

Be it known that I, CHARLES W. WYMAN, a citizen of the United States, residing at Claremont, in the county of Sullivan and State of New Hampshire, have invented certain new and useful Improvements in Mining Apparatus, of which the following is a full, clear, and exact specification.

My invention relates to mining apparatus. It has for its object to provide improved protecting means for an operator of a mining machine whereby shocks arising from contact of the operator with the machine frame may be effectually prevented in an improved and simplified manner. Another object of my invention is to provide such a protective means whereby the machine frame may be grounded at a point in the main entry, my invention contemplating improved means whereby this result may be obtained with either direct or alternating current and either through the utilization of the usual conductors or of the latter and a supplemental conductor. These and other objects and advantages of my improved construction will hereinafter more fully appear.

In the accompanying drawings I have shown for purposes of illustration three embodiments which my invention may assume in practice.

In these drawings,—

Fig. 1 is a diagrammatic plan view of mining apparatus equipped with my improvement, the mining machine truck for facility of illustration being omitted.

Fig. 2 is a similar view of a modified form of my improvement.

Fig. 3 is a similar view of a further modified form of my improvement.

In the illustrative constructions, I have shown a mining machine 1 in position on the bottom removed from its truck though still electrically connected to a trailer reel 2, the truck proper being omitted to facilitate illustration, although it will be understood that the same is normally disposed on the track ends of the room track in front of the trailer and that the reel may in certain instances be carried on this truck instead of on a separate trailer.

Regarding more particularly the construction shown in Fig. 1, it will be observed that the mining machine includes a usual direct current motor, comprising an armature 3 and field windings 4, controlled by a suitable resistance controller 5 and supplied with current through conductors 6 and 7, of which the conductor 6 is the positive lead while the conductor 7 is the negative. These conductors extend through a suitable cable 8 and are branched at their rear ends into their constituent members 6 and 7 and connected through suitable connectors 9 and 10 to a reel 11 carried on the truck mechanism, herein on the trailer 2. As shown, conductors 12 and 13 leading from the reel and connected to the conductors 6 and 7 respectively, are included in a cable 14 and respectively connected in the main entry through a trolley clip 15 to the feeder wire 16 and through a ground connection 17 to the rail 18.

In such a construction, when for any reason the machine frame becomes charged, an operator touching the same is apt to receive a shock due to the passage of the current to ground through his body, such a result occurring, for example, when the operator is standing in a wet spot or when the machine is supported on a timber or the like. It has heretofore been proposed to meet this situation by providing a separate conductor connected between the frame of the machine and a point on the truck and thereby ground the machine on the room track, but such a construction is open to disadvantages in that in many instances, the room track is made of wood, so that grounding through the room track rails is impossible. I have accordingly proposed to provide a ground extending from the machine to a point in the main entry where metallic rails are almost universaly used and no difficulty of this nature is accordingly experienced.

In the form of my invention shown in Fig. 1, I have attached to the negative lead 7 of the conductors connected to the machine and at a point preferably within the machine, a short length of conductor 19, the other end of which is connected to the machine frame at 20. Thus it will be observed that the negative conductor for the machine motor is made to act as a ground for the machine whenever the latter is charged and that this conductor and its connected conductors are enabled to perform the function of grounding the machine on the rail 18 in the main entry without the necessity for providing any supplemental conductors.

In the form of my invention shown in Fig. 2, I have illustrated a supplemental conductor 21 connected at 22 to the machine frame and extending through the usual cable and reel to a conductor 23 which is in turn connected by a ground clip 24 to the rail in the main entry, the conductors 21 and 23 in this instance being supplemental to the usual conductors 25 and 26 connected to the mining machine and the usual conductors 27 and 28 respectively connected to the feed wire 29 and the return wire connection 30 and the conductors 21, 25, and 26 being connected to the reel by usual connectors 31, 32, and 33.

In Fig. 3, I have illustrated a modified form of the construction shown in Fig. 2 adapted to be applied to a machine having an A C motor of standard form, the conductors 34 and 35 in this instance corresponding to the conductors 21 and 23 previously described in connection with Fig. 2 and being supplemental to the three conductors 36, 37, and 38 connected between the machine and the reel and the three conductors 39, 40 and 41 connected between the reel and the line in the usual manner, the conductors 34, 36, 37, and 38 being connected to the reel in this instance by usual connectors 42, 43, 44 and 45.

While I have in this application specifically described certain embodiments which my invention may assume in practice, it will be understood that these forms of the same have been shown for purposes of illustration and that the invention may be modified and embodied in various other forms without departing from its spirit or the scope of the appended claims.

What I claim as new and desire to secure by Letters Patent is:—

1. Mining apparatus including an electric mining machine disposable on the mine bottom and a reel disposable on a room trackway, electrical connections for the mining machine extending through the reel and connected to a source of current supply and to ground, and means for grounding the machine frame in the main entry when said frame is on the bottom.

2. Mining apparatus including an electric mining machine disposable on the mine bottom and a reel disposable on a room trackway, electrical connections for the mining machine connected to a source of current supply and to ground and having each connection extending through said reel, and means for grounding the machine frame in the main entry when said frame is disposed on the bottom, said means likewise extending through said reel.

3. Mining apparatus including an electric mining machine disposable on the mine bottom and a reel disposable on a room trackway, electrical connections for the mining machine extending through the reel and connected to a source of current supply and to ground in the main entry, and means for grounding the machine frame in the main entry when said frame is on the bottom.

4. Mining apparatus including an electric mining machine disposable on the mine bottom and a reel disposable on a room trackway, electrical connections for the mining machine connected to a source of current supply and to ground in the main entry and having each connection extending through said reel, and means for grounding the machine frame in the main entry when said frame is disposed on the bottom, said means likewise extending through said reel.

5. Mining apparatus including an electric mining machine disposable on the mine bottom and a reel disposable on a room trackway, electrical connections for the mining machine extending through the reel and connected to a source of current supply and to ground, and means connected to one of said connections for grounding the machine frame in the main entry when said frame is on the bottom.

6. Mining apparatus including an electric mining machine disposable on the mine bottom and a reel disposable on a trackway, electrical connections for the mining machine connected to a source of current supply and to ground and having each connection extending through said reel, and means connected to the machine frame and to the ground return lead of said connections at said machine for grounding the machine frame when said frame is disposed on the mine bottom.

In testimony whereof I affix my signature.

CHARLES W. WYMAN.